(12) United States Patent
Van Driel

(10) Patent No.: US 6,721,329 B1
(45) Date of Patent: Apr. 13, 2004

(54) COMMUNICATION NETWORK USING DIFFERENT TRANSMISSION PROPERTIES

(75) Inventor: Carel J. L. Van Driel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/341,084

(22) PCT Filed: Nov. 2, 1998

(86) PCT No.: PCT/IB98/01740

§ 371 (c)(1),
(2), (4) Date: Jul. 2, 1998

(87) PCT Pub. No.: WO99/22566

PCT Pub. Date: May 14, 1999

(30) Foreign Application Priority Data

Nov. 4, 1997 (EP) .............................................. 97203417

(51) Int. Cl.[7] .......................... H04L 12/28; H04L 12/56
(52) U.S. Cl. ......................... 370/401; 370/400; 370/402
(58) Field of Search ................................. 370/351, 356, 370/400, 401, 402, 389, 392, 396, 397, 395.1, 395.31, 395.21

(56) References Cited

U.S. PATENT DOCUMENTS

| | | | | |
|---|---|---|---|---|
| 5,467,349 A | * | 11/1995 | Huey et al. ................. | 370/397 |
| 5,828,653 A | * | 10/1998 | Goss ........................... | 370/230 |
| 5,991,297 A | * | 11/1999 | Palnati et al. ................ | 370/389 |
| 6,148,001 A | * | 11/2000 | Soirinsuo et al. ........ | 370/395.4 |

OTHER PUBLICATIONS

C.J.L. van Driel, P.A.M. van Grinsven; "A Hybrid Multi [lexing Scheme for Multi–Service Networks"; Proceedings SPIE conference on Broadband Access Networks, vol. 2917, Boston, Nov. 1996.

\* cited by examiner

Primary Examiner—Wellington Chin
Assistant Examiner—Raj Jain
(74) Attorney, Agent, or Firm—Gregory L. Thorne

(57) ABSTRACT

In an ATM communication network ATM cells to be transmitted from a terminal device (46) to a network control node (12) are transmitted according to certain transmission properties also called Quality of Service. In order to determine the Quality of Service with which a given packet has to be transmitted, the Quality of Service is determined from address information in the VPI/VCI identifier in the header of the ATM cell. In an embodiment of the invention a network termination (32) comprises address translation means (76) for translating the address present in ATM cells received from the terminal device (46) into addresses indicating the Quality of Service.

5 Claims, 5 Drawing Sheets

COMMUNICATION NETWORK USING DIFFERENT TRANSMISSION PROPERTIES

BACKGROUND OF THE INVENTION

The present invention is related to a communication network comprising a plurality of secondary nodes being coupled to at least one primary node, said secondary nodes being arranged for transmitting packets to the primary node according to predetermined transmission properties.

The present invention is also related to a node for use in such a communication network and a communication method.

A communication network according to the preamble is known from the conference paper "A Hybrid Multiplexing Scheme for Multi-Service Networks" published in the proceedings of SPIE conference on Broadband Access Networks, Vol. 2917, Boston, November 1996.

There is an increasing interest in switched broadband networks to offer various services to subscribers connected to such networks. Possible services are Broadcast TV, Video on Demand, Video conferencing, telephony and fast Internet access. One of the most promising solutions for realizing such a network is a so-called Hybrid Fiber Coax (HFC) network. Standardization of these broadband networks is done in IEEE802.14, DVB and DAVIC.

In order to provides services having quite different properties such networks can be based on ATM. In ATM the information to be transmitted is subdivided in fixed length packets with a 5 byte header and a 48 byte payload area. In ATM the possibility exists to transmit different types of packets (audio, video and data) using different transmission properties, also called Quality of Service types. For real time video communication, a high bit rate and a low delay are required. For video broadcast a high bitrate is required, but some delay can be tolerated. In both cases a Constant Bit Rate connection is required, each with different delay requirements. For real time audio transmission the bitrate can be lower, but the delay requirements are substantially the same. For data communication such as file transfer a lower bitrate can be tolerated, and almost no delay requirements have to be fulfilled.

In the above mentioned prior art document it is not disclosed how the required transmission properties are associated with packets to be transmitted to the primary node.

SUMMARY OF THE INVENTION

An object of the present invention is to provide a communication network according to the preamble in which the required transmission properties are associated in an easy way with the packets to be transmitted to the primary node.

To achieve said object, the communication network according to the invention is characterized in that the secondary node comprises selection means for selecting packets according to address information in their header, and in that the transmission means are arranged for transmission of said packets with transmission properties dependent on the selection performed by the selection means.

By selecting packets according to their address information and assigning transmission properties according to said address information, the transmission properties are associated with the packets to be transmitted in an easy and effective way.

An embodiment of the communication network according to the invention is characterized in that in that the secondary node comprises address translation means for translating initial address information carried by packets received from at least one terminal device into said address information carrying information about the transmission properties to be used for transmitting the associated packets.

This embodiment of the communication network allows it to be interfaced to terminal devices which are being addressed in a standard way. This standard way can be the way terminal devices are addressed in a public ATM network. By translating the standard address into an address comprising information about the transmission properties to be used, the terminals can still be identified in a standard way. The address assigned to a secondary terminal in such a core network is translated into an address suitable for use in the network according to the invention. By identifying the transmission resource by a first part of the address information, the signal can be directed into the proper part of the network. The second part of the address information can be used to direct the further routing in the network.

A further embodiment of the communication network according to the invention is characterized in that the communication network comprises further address translating means for translating said address information back into the address information present in the packets received by the secondary nodes from said terminal device.

By introducing additional address translating means for translating the translated address part back into the address information present in the packets received from the terminal devices, it is obtained that the communication network according to the invention is fully transparent between the input of the secondary node and the output of the primary node.

A further embodiment of the communication network according to the invention is characterized in that the communication network comprises cross connect means for passing packets from the secondary nodes to an outside network, and in that the further address translating means are arranged for translating the address information before the packets are applied to the cross connect means.

By positioning the further address translation means between a cross connect and the rest of the network, the network specific address information can be used in the complete network except the connections to a core network and the connections to the terminal units.

BRIEF DESCRIPTION OF THE DRAWING

The invention will now be explained with reference to the drawings. Herein shows.

DETAILED DESCRIPTION OF THE PREFERRED EMBODIMENTS

Figure 1:
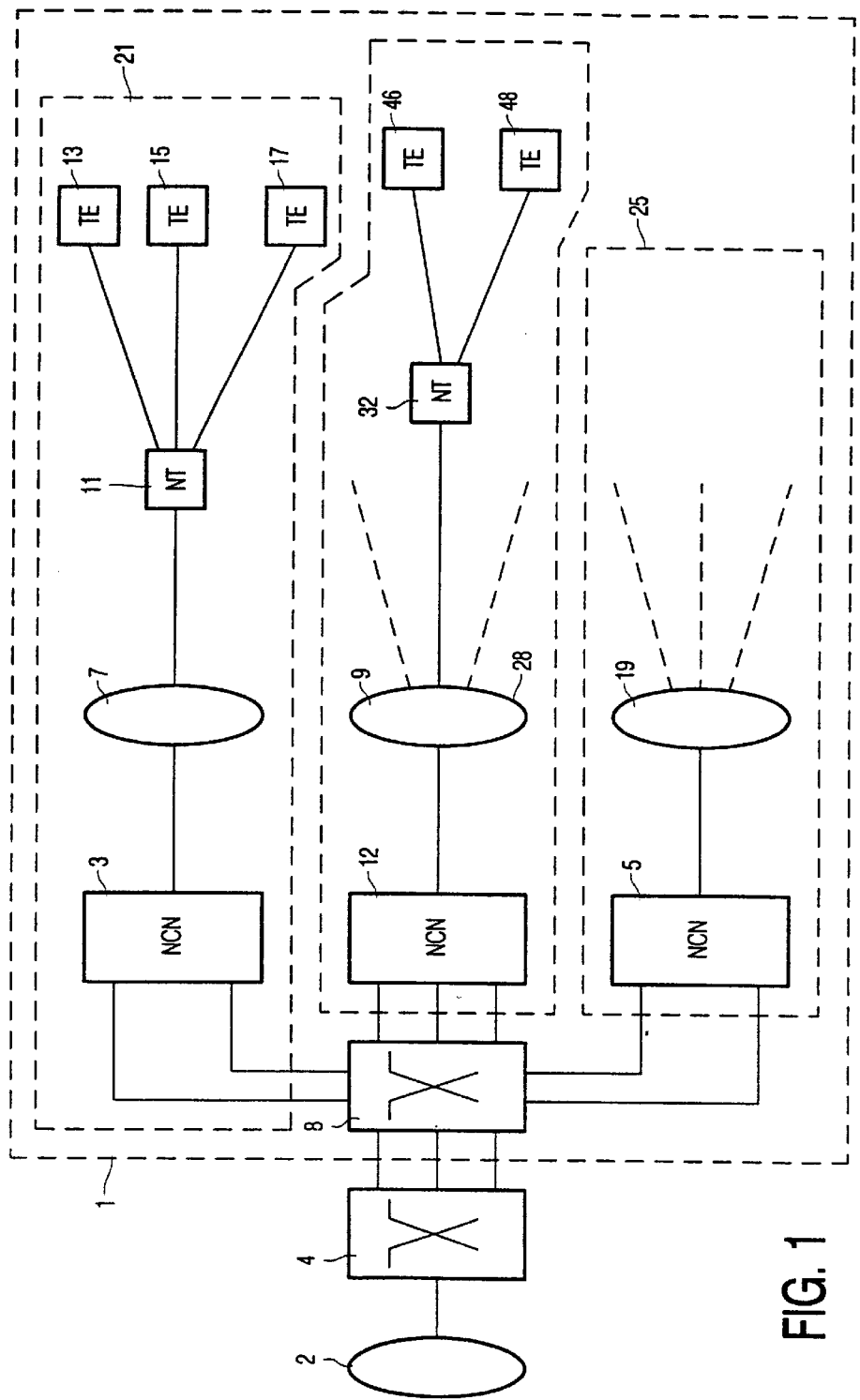
FIG. 1 a communication network in which the invention can be applied.

The communication network according to FIG. 1 comprises an access network 1 which is connected to a core network 2 via a switch 4. The access network comprises a plurality of service areas 21, 23 and 25. The switch 4 is coupled to said service areas 21, 23 and 25 via a cross-connect 8. Each of the service areas 21, 23 and 25 comprises a corresponding Network Control Node 3, 12 and 5 respectively. The network control nodes 3, 12 and 5 are coupled to a HFC network which normally comprises a shared transmission network 7, 9 and 19 such as a CATV coax network.

The Network Control Nodes transform the signals received from the cross connect 8 into signals modulated on separate carriers for transmission into the corresponding HFC network. In the HFC network a number of carriers e.g. 128 are available for transmission signals to the secondary nodes, being here network terminations (NT) One of these network terminations 11 is drawn in FIG. 1. Each NT is arranged for receiving one of said carriers used in the HFC network. The network termination 11 is arranged for passing the signals received from the HFC network to the terminal devices 13, 15 and 17. In each service area the same carrier frequencies can be used because there is no connection between the HFC networks of different service areas.

The network terminations 11 and 32 are arranged for passing signals from their terminals 13, 15, 17 and 46, 48 respectively via an upstream carrier via the HFC network 7, 9 to the corresponding Network Control Node 3, 12. In order to be able to use the HFC network for upstream transmission an access protocol such as described in IEEE 802.14, DVB or DAVIC should be used.

Figure 2:
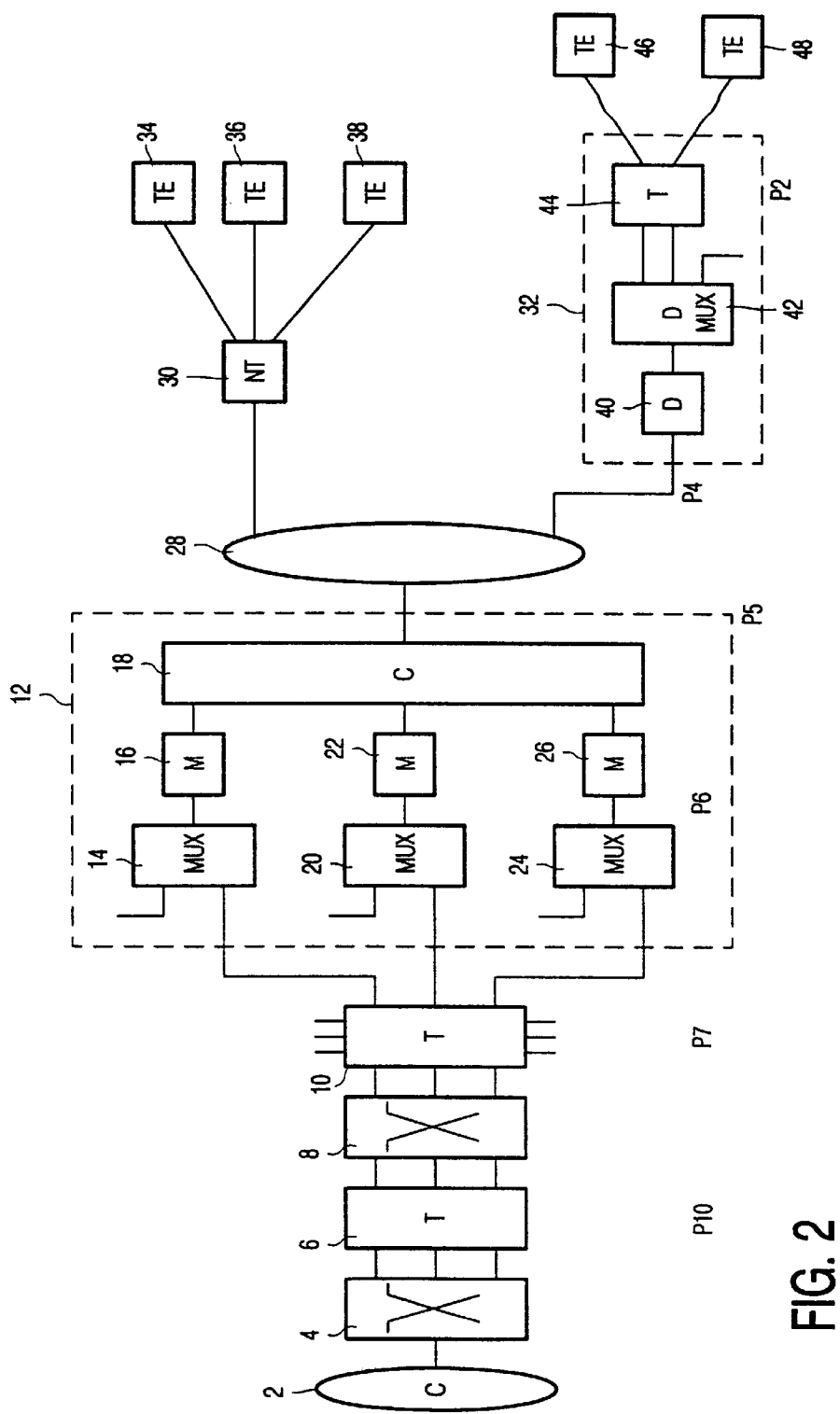
FIG. 2 the downstream elements in a communication network according to the invention.

In FIG. 2, the downstream elements used in the network according to FIG. 1 are drawn in more detail. The core network 2 is a public broadband network which can be based on ATM. The switch 4 is arranged for setting up connections between subscribers connected to the core network and subscribers connected to the access network 1. The switch 4 is also arranged for setting up local connections between subscribers both connected to the access network 1. The address information contained in the ATM cells entering and leaving the switch 4 is according to the addressing scheme used on the core network 2.

The switch 4 is further connected to a cross-connect 8 which is arranged for directing the ATM cells into the proper parts in the access network. In order to enable the cross connect to direct the ATM cells to the proper parts of the network, at an interface P10 the address of the ATM cell is translated by the further translation means, being here a translator 6. The address carried by ATM cells at the input of the translator 6 is translated into an address comprising a VPI identifier identifying the service area to which the cell should be routed and which carrier should be used in said service area. This translation is performed by reading a table which is addressed with the original VPI/VCI identifier of the ATM packet.

The table in translator 6 is updated each time a connection is set up or is disconnected. During the set up of a call a table entry with input value the VPI/VCI identifier of the terminal to be called is added. The corresponding output value comprises information about the service area and the carrier to be used in the VPI field, and an identification of the terminal to be addressed in the VCI field.

The cross connect 8 reads the VPI field of the incoming ATM packets, and routes it to an output determined by the VPI value. All outputs of the cross connect 8 are passed to the address translating means according to the inventive concept, being here an address translation unit 10. The address translation unit 10 replaces the combination of VPI/VCI by a new combination of VPI/VCI which is determined from the original VCI value only. This translation enables a more flexible addressing, because a larger address space is available.

In the new combination of VPI/VCI, the VPI field is used to address the network terminator to which the destination terminal is connected. The VCI field identifies the destination terminal.

The ATM packet with the translated address information, is passed via a multiplexer 14 to a modulator in the service area having a predetermined carrier frequency. The selection of the service area and the modulator (is selection of carrier frequency) therein is done on basis of the output VPI value at interface P10. The multiplexer 14 is present to enable the Network Control Node 12 to transmit control information to the corresponding Network Termination. The output signal of the selected modulator (e.g. 22) is combined with the output signals of the other modulators (e.g. 22 and 26) and transmitted via the coax network 28 to the network terminations 30, 32.

The network terminations 30, 32 demodulate and process the signal received at the carrier frequency assigned to them. In the network termination 32 a demodulator 42 demodulates the signal received from the HFC network 28. A demultiplexer 42 connected to the demodulator 40 extracts control information intended for control of the Network Termination 32. A plurality of outputs of the demultiplexer 42 is connected to the additional address translating means, being here an address translator 44. This address translator 44 translates the VPI/VCI combination introduced by the address translator 10 into the addresses as they were received from the core network. Subsequently the packets are transmitted to the terminals 46 and 48.

If the VPI field is 12 bits and the VCI is 16 bits as is the case for ATM cells for use on Network Node Interfaces 12 bits are available for identifying the Service Area and the carrier frequency to be used therein. If the network comprises 32 service areas, 128 carrier frequencies can be defined. For each of the service areas 12 bits are available for identifying the network termination and 16 bits are available for identifying the terminal. Consequently 4096 network terminations and 65536 terminals can be addressed in each service area.

Without the address translation at interface P10, 16 bits would be available for addressing the network terminations and the terminals. If in such a case 4096 NT had to be addressed, only 16 terminals could be selected with the remaining address space. Consequently only 16 terminals could be connected to one Network Termination. By using the address translation according to the invention 65536 terminals can be in a connection, without any constraint to the network termination they are connected to.

Figure 3:
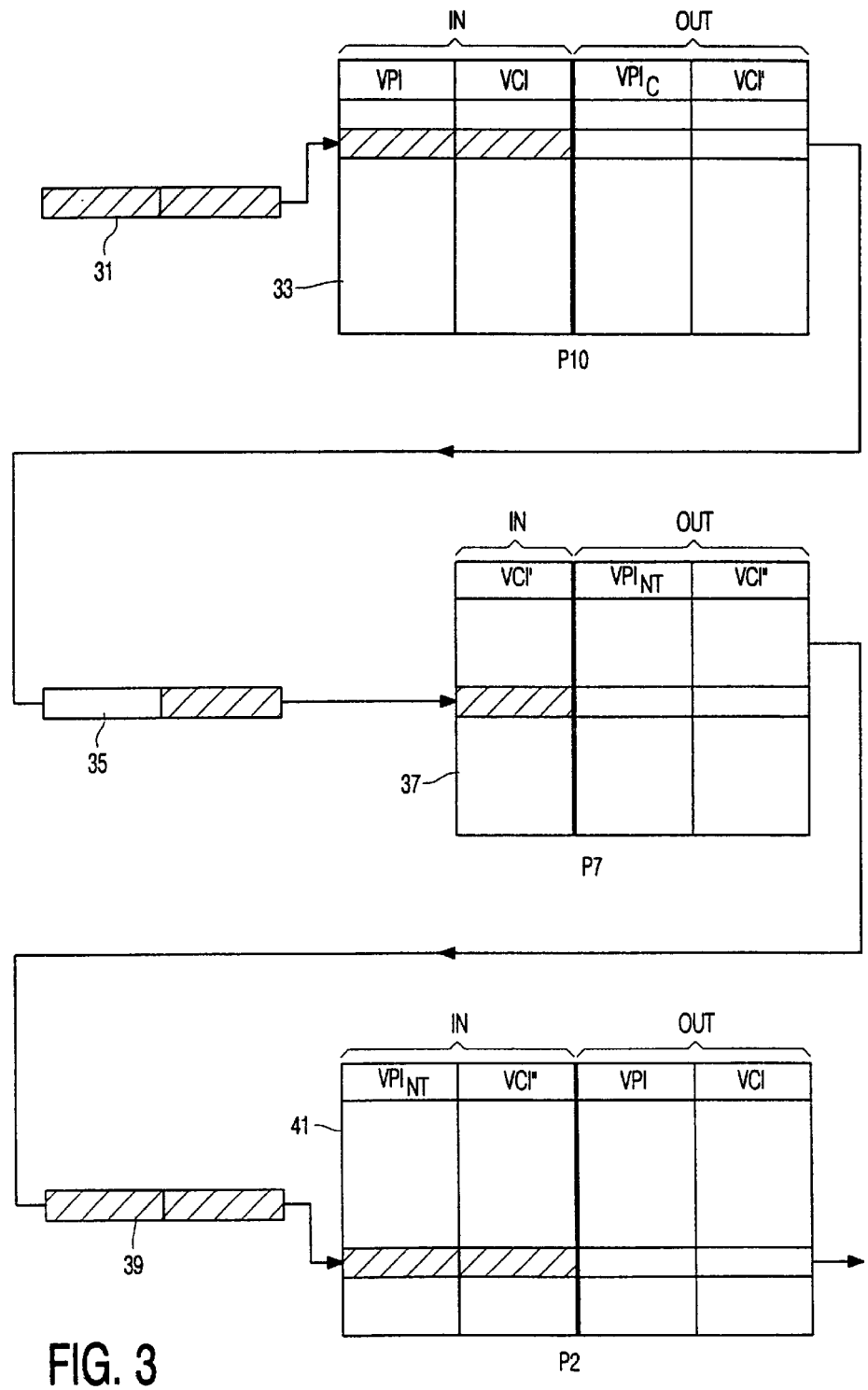
FIG. 3, a diagram explaining the address translations to which an ATM cell is subjected when it is transmitted from the core network 2 to the terminal 46.

FIG. 3 shows the sequence of address translation to which an ATM packet is subjected when traveling from the core network to a terminal. A packet from the core network 2 has a VPI/VCI part 31 as is shown in FIG. 3. At the interface P10 this VPI/VCI part is translated into a $VPI_C$/VCI' part 35. This translation is performed by addressing a table 33 with the VPI/VCI part as input signal and reading the $VPI_C$/VCI' part from the output of the table 33. The table 33 is held by the translation means 6 in FIG. 2. As can be seen in FIG. 3 the complete address information VPI/VCI is used for addressing the table 33.

The $VPI_C$ part of the address information 35 is used to route the ATM packet to the proper service area and modulator. The VCI' part of the address information is used as input for the translation of the address information at interface P7. The VCI' part is used to address a table 37 from which the translated address information $VPI_{NT}$/VCI" is read. The table 37 is held in the translation means 10 in FIG. 2. The part $VPI_{NT}$ indicates the address of the NT to which the destination terminal is connected, and the part VCI" indicates the address of the destination terminal.

The combination 39 of the address information $VPI_{NT}$/VCI" is used as input for the address translation at interface P2. Said combination of $VPI_{NT}$/VCI" is used to address a table 41 which is held in the translator 44 in FIG. 2. At the output of the table the VPI/VCI combination according to the addressing scheme of the core network is available for addressing the terminal.

Figure 4:
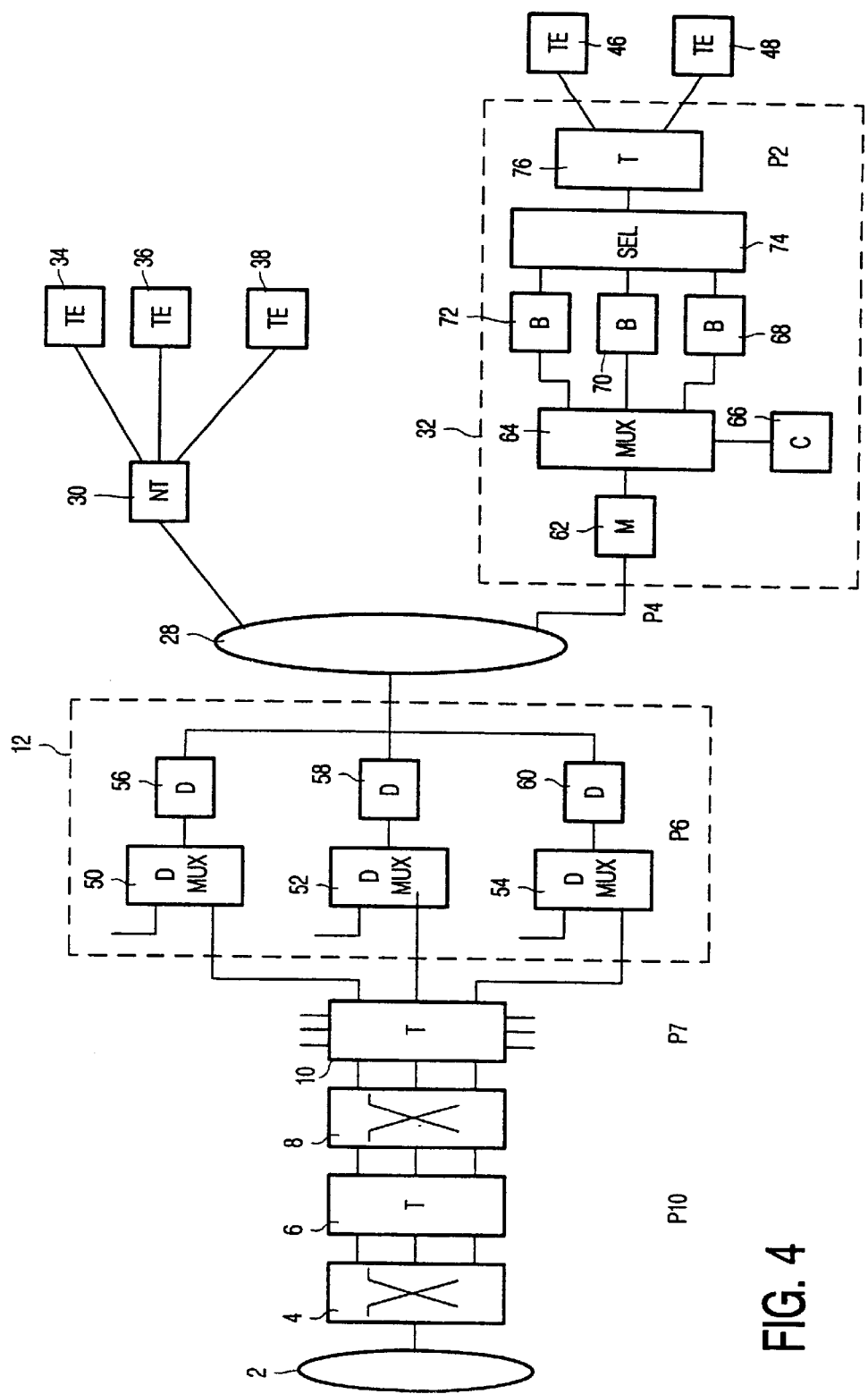
FIG. 4, the upstream elements in a communication network according to the invention.

FIG. 4 shows the elements involved with the upstream transmission for a communication network according to FIG. 1. An ATM packet originated at a terminal 46 or 48 is applied to an address translator 76. The address translator 76 in the network termination 32 translates the original address information VPI/VCI into translated address information $VPI_{NT}$/$VCI_{PRIOR}$.

The part VPI indicates the Network Termination 32 via which the packet is transmitted. According to an aspect of the present invention, the part $VCI_{PRIOR}$ indicates the Quality of Service with which the ATM packet has to be transmitted. The selection means being here a selector 74, selects the ATM packets received from the translator 76 and passes them to one of the buffers 68, 70 or 72 according to their $VCI_{PRIOR}$ indicator. The buffer 68 can be assigned to a Constant Bitrate QoS (CBR) with a high bitrate, the buffer 70 can be assigned to a Constant Bitrate QoS (CBR)with a medium bitrate, and the buffer 72 can be assigned to a Variable Bitrate (VBR) QoS.

A CBR QoS with high bitrate is e.g. suitable for transmission of video signals, a CBR QoS with medium bitrate is e.g. suitable for transmission of audio signals, and a VBR QoS is suitable for the transmission of data which occurs e.g. with file transfer. The ATM packets at the output of the buffers 68, 70 and 72 are multiplexed with a multiplexer 64 into an output stream. The multiplexer takes the different QoS properties of the output signals of the buffers 68, 70 and 72 into account, by transmitting the packets according to a priority which is dependent on the buffer from which the packet is read. It is clear that the buffers carrying CBR signals have a higher priority than the buffers carrying VBR signals. Amongst the buffers carrying CBR signals, the buffers assigned to high bitrate streams have the highest priority. Besides the signals from the buffers 68, 70 and 72, also a control signal from the network termination 32 is applied to an input of the multiplexer, in order to be transferred to the network control node 12.

The output signal of the multiplexer 64 is modulated by a modulator 62 on a carrier with a frequency which is assigned to the network termination 32. The transmission means according to the inventive concept comprises the combination of the multiplexer 64 and the modulator 62. The network termination 32 transmits the output signal of the multiplexer 62 via the network 28 to the network control node 12. In the network control node, the signal received is demodulated in one of the demodulators 56, 58 or 60 and demultiplexed by a corresponding demultiplexer 50, 52 or 54. The control information from the network termination 32 is available at a separate output of the demultiplexer for further use in the network control node 12.

The outputs of the demultiplexers 50, 52 and 54 are connected to corresponding inputs of an address translator 10. This address translator translates the combination of $VPI_{NT}$/$VCI_{PRIOR}$ into new address information $VPI_{OUT}$/VCI'. This translation is obtained by reading a table entry using the $VCI_{PRIOR}$ indication as entry. The ATM cells at the output of the address translator 10 are passed by the cross-connect 8 to one of its outputs according to the $VPI_{OUT}$ indicator of the ATM packet. The outputs of the cross connect 8 are connected to corresponding inputs of address translation means 6. The address translating means 6 translates the combination of $VPI_{OUT}$/VCI' into the original destination address VPI/VCI of the packet. The packet with the original address VPI/VCI is transferred to the switch 4 in order to transmit the packet to the core network 2.

Figure 5:
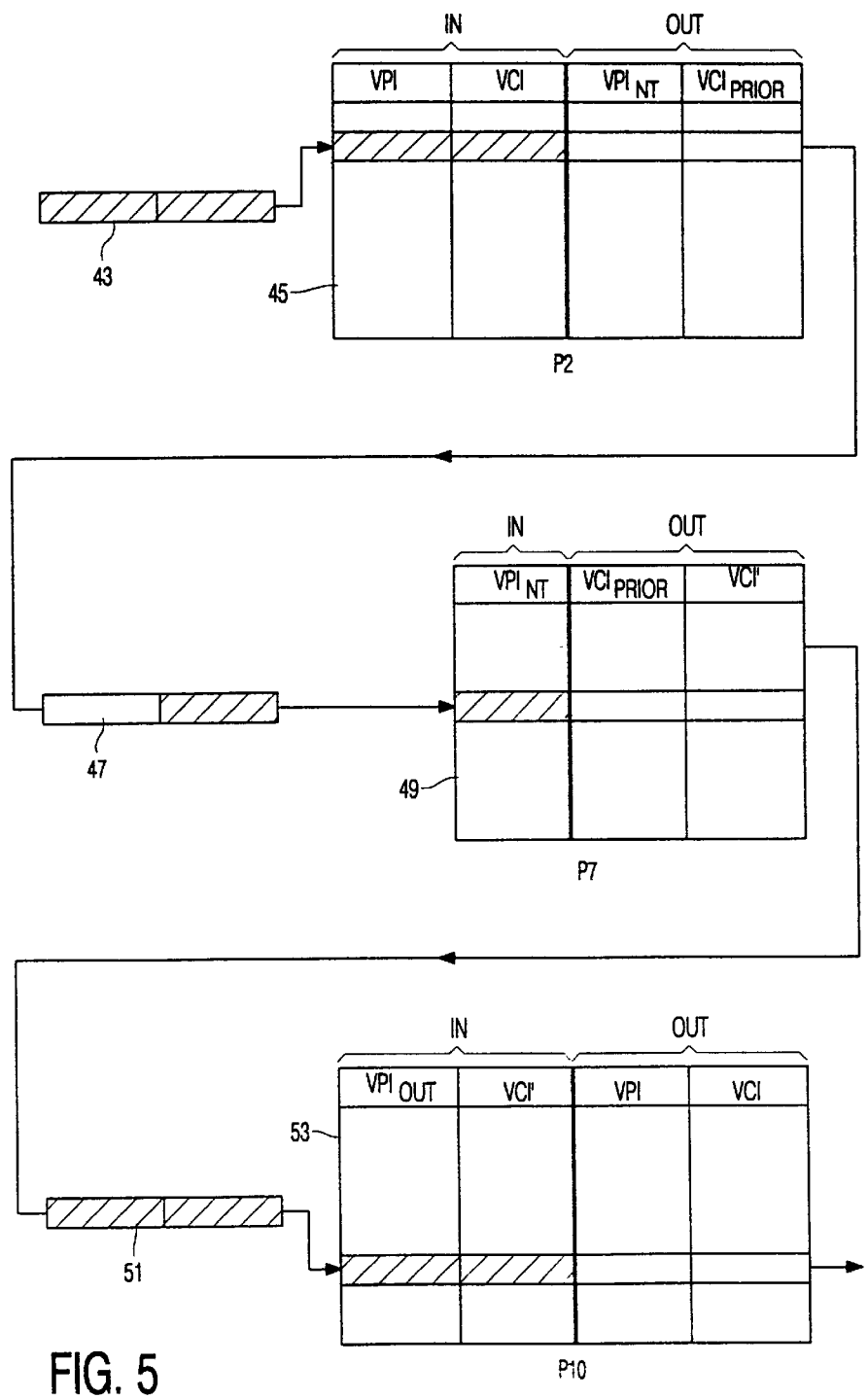
FIG. 5, a diagram explaining the address translations to which an ATM cell is subjected when it is transmitted from the terminal 46 to the core network 2.

FIG. 5 shows schematically the sequence of address translation to which an ATM packet is subjected when traveling from a terminal 46 or 48 to the core network. A packet from the terminal 46 or 48 has a VPI/VCI part 43 as is shown in FIG. 5. At the interface P2 this VPI/VCT part is translated into a $VPI_{NT}$/$VCI_{PRIOR}$ part 47. This translation is performed by addressing a table 45 with the VPI/VCI part as input signal and reading the address information $VPI_{NT}$/$VCI_{PRIOR}$ from the output of the table 45. The table 45 is held by the translation means 76 in FIG. 5. As can be seen in FIG. 5 the complete address information VPI/VCI is used for addressing the table 45.

The $VCI_{PRIOR}$ part of the address information 47 is used to route the ATM packet to the Network Control Node 12 via a path being able to provide transmission according to the proper Quality of Service indicated by the address part $VCI_{PRIOR}$. The $VCI_{PRIOR}$ part of the address information is used as input for the translation of the address information.

At interface P7, the $VCI_{PRIOR}$ part of the address information 47 is used to address a table 49 from which the translated address information $VPI_{OUT}$/VCI' is read. The table 49 is held in the translation means 10 in FIG. 4. The part $VPI_{OUT}$ indicates the output of the cross connect 8 to which the packet should be transferred.

The combination 51 of the address information $VPI_{OUT}$/VCI' is used as input for the address translation at interface P10. Said combination of $VPI_{OUT}$/VCI' is used to address a table 53 which is held in the translator 6 in FIG. 5. At the output of the table 53 the VPI/VCI combination according to the addressing scheme of the core network is available for submitting the packet to the switch 4.

It is observed that the address translation at the interfaces P10, P7 and P2 are very similar for upstream and downstream. This enables that the translation units 6, 10 and 76 can be used for downstream and upstream traffic.

What is claimed is:

1. Communication network comprising:
   a plurality of secondary nodes being coupled to at least one primary node,
   the secondary nodes being arranged for transmitting packets to the primary node according to a plurality of predetermined transmission properties,
   characterized in that
   the secondary node comprises:
   a first address translator that is configured to translate initial address information carried by packets received from at least one terminal device into address information in headers of the packets comprising information about transmission properties to be used for transmitting the associated packets,
   a selector that is configured to select packets according to the information about the transmission properties contained in the address information in their header, a transmitter that is configured to transmit each of the packets with one or more transmission properties of the plurality of predetermined transmission properties corresponding to the selection performed by the selector, and the network further includes a second address translator that is configured to translate the address information in the packets received from the secondary node back into the initial address information present in the packets received by the secondary nodes from the terminal device.

2. Communication network according to claim 1, characterized in that the primary node comprises the second address translator.

3. Communication network according to claim 1, further comprising a cross connect switch that is configured to pass packets from the secondary nodes to an outside network wherein the second address translator is configured to translate the address information before the packets are applied to the cross connect switch.

4. Node for use in a communication network, the node being arranged for transmitting packets according to a plurality of predetermined transmission properties to a primary node, characterized in that the secondary node comprises selection means for selecting packets according to address information in their header, transmission means that are arranged for transmission of the packets with one or more transmission properties of the plurality of transmission properties dependent on the selection performed by the selection means, and address translation means for translating initial address information carried by packets received from at least one terminal device into the address information carrying information about the transmission properties to be used for transmitting the associated packets, wherein the primary node is configured to translate the address information back into the initial address information present in the packets received by the secondary nodes.

5. Communication method comprising:

translating initial address information carried by packets received from at least one terminal device into address information in the header of the packets, the address information comprising information about transmission properties to be used for transmission of the associated packets, selecting packets according to the information about the transmission properties contained in the address information in their header, transmitting the packets from a node with one or more transmission properties of the plurality of predetermined transmission properties corresponding to the selection performed, receiving the packets at an other node, and translating the address information from the packets that are received at the other node back into the initial address information present in the packets from the at least one terminal device.

* * * * *